UNITED STATES PATENT OFFICE.

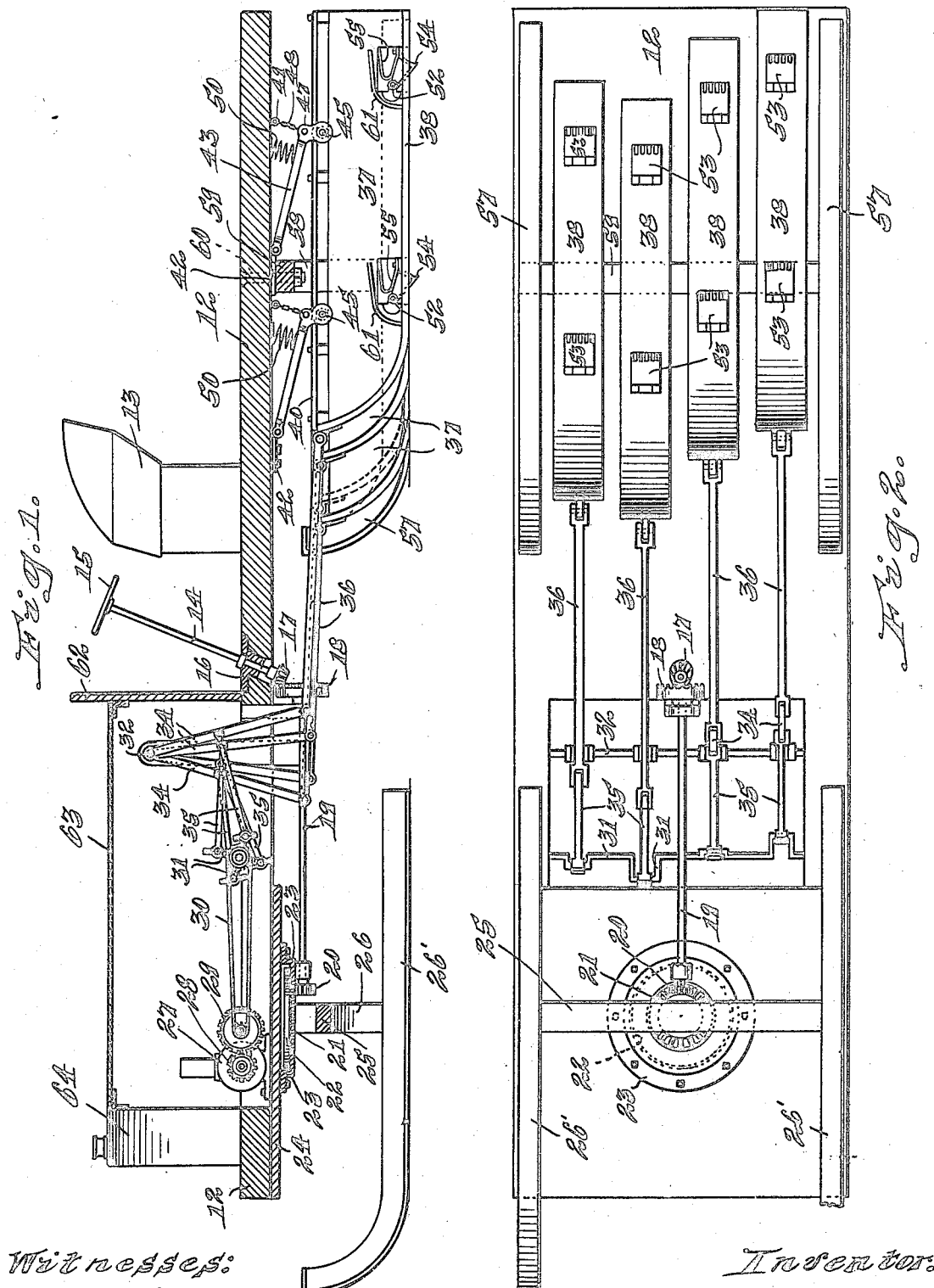

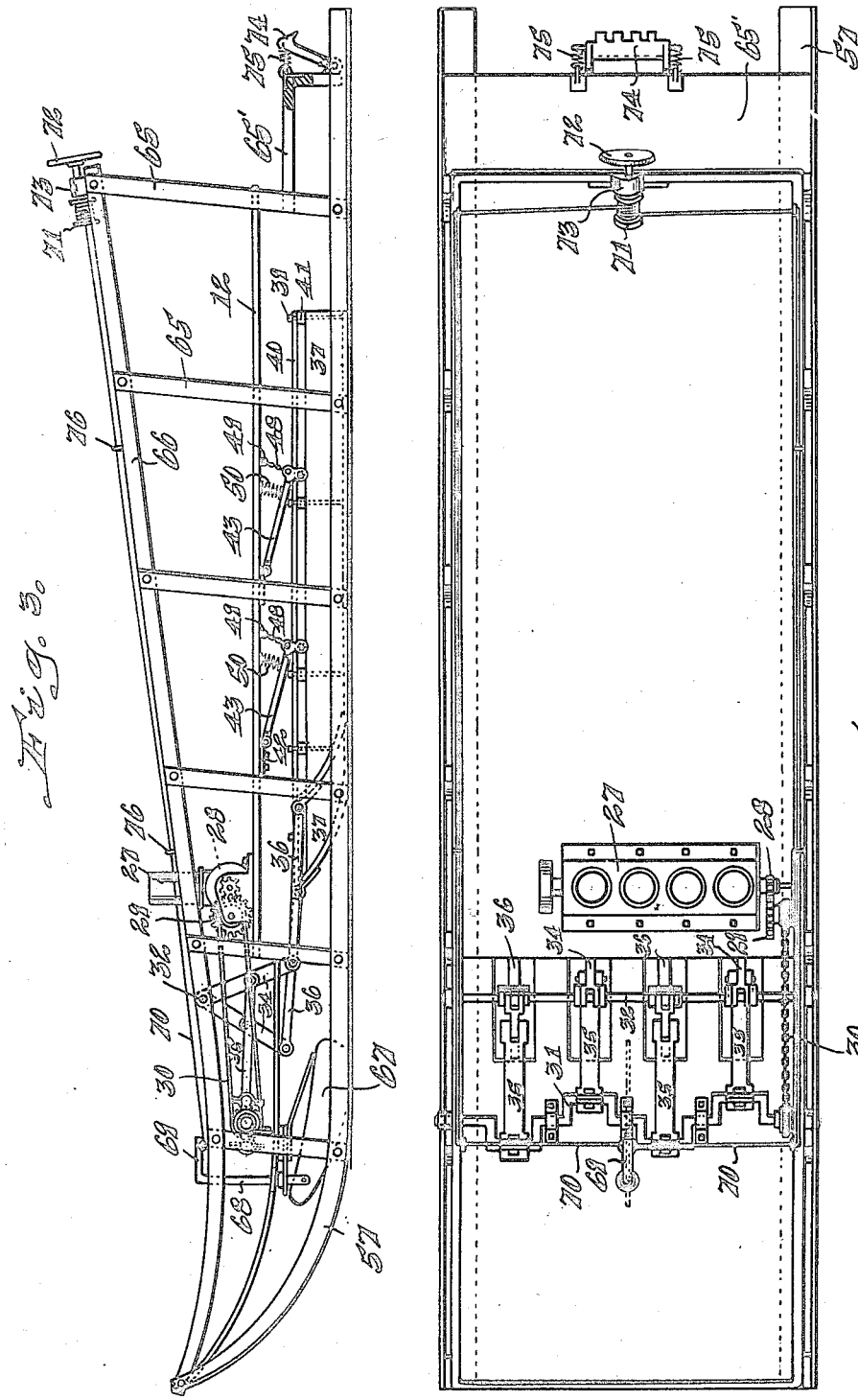

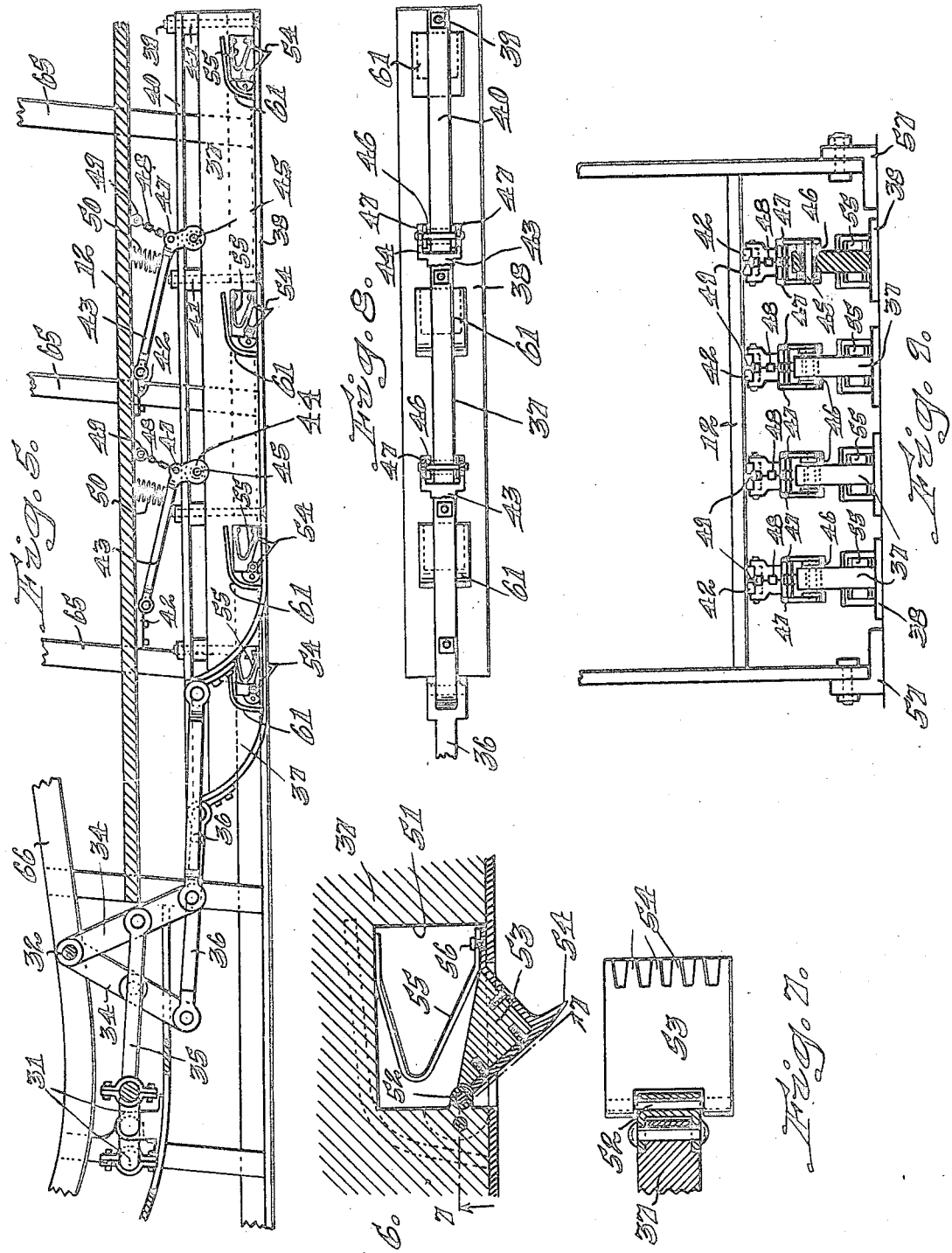

GUSTAVE A. AMBURSON, OF SAN FRANCISCO, CALIFORNIA.

MOTOR SLED.

1,419,483.

Specification of Letters Patent. Patented June 13, 1922.

Application filed January 5, 1920. Serial No. 349,512.

*To all whom it may concern:*

Be it known that I, GUSTAVE A. AMBURSON, a subject of the King of Sweden, and a resident of the city of San Francisco, county of San Francisco, and State of California, have invented certain new and useful Improvements in Motor Sleds, of which the following is a specification.

My invention relates to new and useful improvements in motor sleds, and has for its object the provision of a motor sled having reciprocating runners.

Another object is the provision in a motor sled reciprocating runners having gripping means operative during the backward stroke of said runners.

Other objects will appear hereinafter.

The invention consists in the combinations and arrangements of parts hereinafter described and claimed.

The invention will be best understood by reference to the accompanying drawings forming a part of this specification, and in which, Fig. 1, is a longitudinal vertical sectional view of the invention, Fig. 2, is a bottom plan view of the invention, Fig. 3, is a side elevational view of a modified form of the invention, with parts removed, Fig. 4, is a top plan view of the device shown in Fig. 3, Fig. 5, is a fragmentary sectional view illustrating the reciprocating runners, Fig. 6, is a fragmentary sectional view illustrating the dog used in the invention, Fig. 7, is a bottom plan view of the dog used in my invention, Fig. 8, is a top plan view of one of the reciprocating runners, and Fig. 9, is a fragmentary rear elevational view of the invention.

The approved form of construction, as illustrated in the drawings comprises a sled having a main body portion 12, upon which is mounted a suitable seat 13, which is designed for use by the driver. Projected through a socket bearing plate 16 which is mounted upon the body 12 is a steering post 14 to the upper end of which is rigidly mounted a hand wheel 15. Mounted upon the lower end of the post 14 is a bevel gear 17, which is adapted to mesh with a gear wheel 18 which is rigidly mounted upon a shaft 19. Rigidly mounted upon the opposite end of the shaft 19 is a gear wheel 20 which is adapted to mesh with a gear wheel 21 which is rigidly attached to a disc 22. Brackets 23 which are secured to a board 24 which is fastened to the member 12 serve to retain the disc in loosely mounted position. The disc 22 is secured to a cross member 25 which connects supporting members 26 to the lower end of which are fastened runners 26'. The construction is such that upon a forward movement of the body 12, the same may be guided through a manipulation of wheel 15, as will be readily understood.

Mounted upon the member 24 is a gasoline motor 27 secured to the rotating shaft of which at one side thereof is a gear wheel 28, which is adapted to mesh with a gear wheel 29 which is mounted upon a suitable shaft. The gear wheel 29 carries at one side thereof a sprocket wheel which is connected by means of a chain 30 to a sprocket wheel which is rigidly mounted upon a crank shaft 31. A shaft 32 is mounted upon the member 12 by means of suitable supports and loosely mounted upon and depending therefrom are oscillating arms 34 which are connected with the crank shaft 31, intermediate their ends, by suitable arms 35. The lower ends of the members 34 are pivotally connected to arms 36 each of which is pivotally mounted at its opposite end to a reciprocating runner which is used with the device. These reciprocating runners comprise a surface bearing portion 38 which is comparatively broad, and an upright extending portion 37 which projects from the center of the base 38, said portion 37 forming a reinforcement for the base portion 38. Projecting through the portion 38 and extending through the portions 37 of the runners and at spaced intervals are bolts 39, by means of which a guide plate 40 is secured to the runner. Spacing blocks 41 are positioned upon the bolts 39 intermediate the upper surface of the portion 37 and the member 40, so as to space the member 40 from the runner proper. Mounted upon the under surface of the body 12 are plates 42 to which arms 43 are pivotally connected. Each of the arms 43 is bifurcated at 44 at its free end for sliding connection with one of the runners, such connection being effected by means of a spool or roller 46 held in position by a pin 45 passing through the end of the arm 43 below the guide plate 40. Formed adjacent to the bifurcated end portions of the members 43 are eye-bearing lugs 47, which are connected by means of suitable chains 48 to eye-screws 49 mounted upon the body 12. Positioned between the member 43 adjacent its bifurcated end portion and the body 12 is a spiral spring 50, studs projecting from the arm 43 and the under surface of the body 12 which are embraced by the opposite ends of the spring 50 and which serve to retain the spring 50 in its mounted position, as clearly seen in Fig. 5. The portion 37 of each of the runners is provided with a series of slots 51 projecting inwardly from one side of each of which is a lug 52 which is rigidly mounted to the portion 37. Pivotally mounted upon the lug 52 is a dog 53 provided with pointed teeth 54. Secured to one end of the dog 53 by means of a suitable bolt 56 and positioned within the recess 51 is a bent leaf spring 55. Rigidly mounted upon the body 12 adjacent the rearward end thereof and at opposite sides thereof are stationary runners 57 which are supported by upright members 58, said upright members 58 being connected at their upper ends by a cross piece 59, through which bolts 60 project for the securing of the same to the body 12. Mounted upon the portion 37 of the runners in front of and extending over the recess 51, are suitable guards 61 which are designed to divert the snow from the recess 51 and prevent the lodging of the same therein. In the form shown in Fig. 1, a dash board 62 is provided and a hood 63 serves to enclose the operating mechanism. Mounted at the forward end of the body 12 is a radiator 64 such as is commonly used with gasoline engines.

In the form shown in Fig. 3, the driver stands upon a platform 65' which is provided in the rear of the main body of the sled. Upright members 65 serve to support side rails 66. To these side rails 66 and the upright members 65 may be secured boards or other material forming the sides of the sled.

In the form shown in Fig. 3, a rudder 67 is pivotally mounted adjacent the forward end of the sled intermediate the stationary runners 57. Projecting upwardly from one end of the rudder 67 is a rod 68 having at its upper end a horizontally extending portion 69 to the opposite sides of which, adjacent its end, are secured steering ropes 70 which extend along the side rails 66, passing through the screw eyes provided therein to form guides for the member 70. The member 70 is adapted to be wound around a spool 71 to which is connected a hand wheel 72, these members being mounted in a suitable bearing 73 which is positioned upon one of the cross pieces at the rear end. Provided at the rearward end of the sled and pivotally mounted thereto is a dog 74 which is used as a brake for bringing the sled to a stop. The driver standing upon the platform 65' may press the dog downwardly until the same engages the ground and thereby serves as a brake to bring the sled to a stop. Upon releasing the downward pressure on the member 74, which may preferably be exerted by the foot of the driver, the spiral springs 75 which are connected to the free end of the dog 74 and to the platform 65' serve to raise and retain the member free from contact with the ground.

In operation, upon the starting of the motor 27, the crank shaft is set into operation and oscillating levers 34 serve to reciprocate the runners to which the arms 36 are attached. As the runners move forwardly relatively to the body of the sled, the dogs 53 are pressed upwardly into the recesses 51 against the tension of the springs 55. As the backward movement of the runner begins, that is, as the runner starts its motion which would carry it backward relatively to the body 12, the dogs 51 engage in the ground and grip the same, thereby impelling the body of the sled forward. As is evident from the construction of the crank shaft, there will be at least one of the runners delivering the forward impulse to the body of the sled at all times, when the motor is in operation. In this way, the sled is caused to travel along the snow or ice and the driver may guide the same in any direction, either through the manipulation of the hand wheel 15 or the hand wheel 72. The runners 46 and the bifurcated ends 44 of the arm 43 serve to guide the supporting runners in their backward and forward movement and the springs 50 serve to press the runners downwardly into close contact with the ground, so that the dogs may have a gripping surface at all times. By providing a plurality of the dogs in the same runner, a gripping surface is thereby afforded, even when the ground traveled over may be uneven or broken, inasmuch as at least one of the dogs will have a gripping surface, should the others be positioned over a depression in the ground.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:

1. In combination with a motor driven sled having a reciprocating runner, said runner having a vertically positioned member longitudinally aligned therewith; resiliently held means pivotally mounted on said sled and engaging the upper edge of said member for holding said runner yieldingly in contact with the ground; a slot in said upwardly extending portion; a dog pivotally mounted in said slot; and a spring member secured to said dog and positioned within said slot for forcing said dog into engagement with the ground upon a rearward stroke of said runner, substantially as described.

2. A sled of the class described comprising reciprocating runners, each of said runners carrying a vertically positioned member longitudinally aligned therewith; spring held arms pivotally carried by said sled, there being rollers carried by said arms engaging the upper edge of each of said members for holding said runners yieldably in contact with the ground, the spring pressure of said arms being operative during the entire forward and backward movement of said runners; and resiliently held ground engaging dogs pivotally carried by said runners substantially as described.

3. A sled of the class described comprising reciprocatory runners, there being a vertically positioned member carried by each of said runners; resiliently held means pivotally mounted on said sled and engaging the upper edge of each of said members for holding said runners yieldably in contact with the ground, the spring pressure of said means being operative during the entire forward and backward movement of said runners; and ground engaging dogs pivotally carried by said runners, substantially as described.

4. In combination with a motor driven sled having reciprocating runners; means for reciprocating said runners; a guide member mounted on each of said runners; arms having bifurcated ends pivotally mounted on said sled and engaging said guide member; and a roller carried by each of said bifurcated arms intermediate said guide member and said runners for governing the travel of said runners and holding said runners in contact with the ground, substantially as described.

In testimony whereof I have signed my name to this specification in the presence of two subscribing witnesses.

GUSTAVE A. AMBURSON.

Witnesses:
PAULA SALA,
A. O. SALA.